US012548954B2

(12) United States Patent
Sun

(10) Patent No.: US 12,548,954 B2
(45) Date of Patent: Feb. 10, 2026

(54) ELECTRICAL CONNECTOR AND METHOD OF MAKING THE SAME WITH SIMPLIFIED ASSEMBLY FEATURES

(71) Applicant: Luxshare precision accessory (Suzhou) LTD., Suzhou (CN)

(72) Inventor: Hongwei Sun, Suzhou (CN)

(73) Assignee: Luxshare precision accessory (Suzhou) LTD., Suzhou (CN)

( * ) Notice: Subject to any disclaimer, the term of this patent is extended or adjusted under 35 U.S.C. 154(b) by 536 days.

(21) Appl. No.: 17/956,126

(22) Filed: Sep. 29, 2022

(65) Prior Publication Data

US 2023/0261425 A1 Aug. 17, 2023

(30) Foreign Application Priority Data

Feb. 14, 2022 (CN) ......................... 202210134184.5

(51) Int. Cl.
*H01R 13/6596* (2011.01)
*H01R 13/02* (2006.01)
(Continued)

(52) U.S. Cl.
CPC ......... *H01R 13/6596* (2013.01); *H01R 13/02* (2013.01); *H01R 13/6585* (2013.01); *H01R 13/6594* (2013.01); *H01R 43/20* (2013.01); *H01R 13/10* (2013.01); *H01R 13/42* (2013.01); *H01R 13/648* (2013.01);
(Continued)

(58) Field of Classification Search
CPC ........................... H01R 13/6596; H01R 13/02; H01R 13/6585; H01R 13/6594; H01R 43/20; H01R 13/10; H01R 13/42; H01R 13/648; H01R 13/658; H01R 13/6582; H01R 13/6591; H01R 24/60; H01R 43/205
See application file for complete search history.

(56) References Cited

U.S. PATENT DOCUMENTS 9,484,662 B2 * 11/2016 Guo ................... H01R 13/6594
9,768,567 B2 9/2017 Cheng et al.
(Continued)

FOREIGN PATENT DOCUMENTS

CN 103579835 A 2/2014
CN 104064910 A * 9/2014
(Continued)

*Primary Examiner* — Justin M Kratt
(74) *Attorney, Agent, or Firm* — Birch, Stewart, Kolasch & Birch, LLP

(57) ABSTRACT

An electrical connector includes a body, a number of first conductive terminals, a number of second conductive terminals, and a metal shielding member. The body includes a base portion and a tongue plate protruding beyond the base portion. Each first conductive terminal includes a first mating portion and a first fixing portion. Each second conductive terminal includes a second mating portion and a second fixing portion. The metal shielding member includes a shielding plate located between the first fixing portions of the first conductive terminals and the second fixing portions of the second conductive terminals, and a mounting plate integrally formed with the shielding plate. The metal shielding member is in elastic contact with the body. The present disclosure also discloses a method of making the electrical connector.

20 Claims, 13 Drawing Sheets

(51) Int. Cl.

| | |
|---|---|
| ***H01R 13/6585*** | (2011.01) |
| ***H01R 13/6594*** | (2011.01) |
| ***H01R 43/20*** | (2006.01) |
| *H01R 13/10* | (2006.01) |
| *H01R 13/42* | (2006.01) |
| *H01R 13/648* | (2006.01) |
| *H01R 13/658* | (2011.01) |
| *H01R 13/6582* | (2011.01) |
| *H01R 13/6591* | (2011.01) |
| *H01R 24/60* | (2011.01) |

(52) U.S. Cl.
CPC ........ *H01R 13/658* (2013.01); *H01R 13/6582* (2013.01); *H01R 13/6591* (2013.01); *H01R 24/60* (2013.01); *H01R 43/205* (2013.01)

(56) References Cited

U.S. PATENT DOCUMENTS

| | | | |
|---|---|---|---|
| 2016/0099526 A1 | 4/2016 | Chen | |
| 2017/0194755 A1 | 7/2017 | Cheng et al. | |
| 2017/0324188 A1 | 11/2017 | Guo et al. | |
| 2017/0338586 A1 | 11/2017 | Wang | |
| 2018/0034215 A1 | 2/2018 | Zhong et al. | |
| 2018/0115118 A1 | 4/2018 | Zhao | |
| 2021/0408741 A1* | 12/2021 | Chen | H01R 13/504 |

FOREIGN PATENT DOCUMENTS

| | | |
|---|---|---|
| CN | 203813127 U * | 9/2014 |
| CN | 104092059 A | 10/2014 |
| CN | 203967304 U | 11/2014 |
| CN | 204243282 U | 4/2015 |
| CN | 105186157 A | 12/2015 |
| CN | 105261892 A | 1/2016 |
| CN | 204947159 U | 1/2016 |
| CN | 205070061 U | 3/2016 |
| CN | 105470735 A | 4/2016 |
| CN | 205724167 U | 11/2016 |
| CN | 206041076 U | 3/2017 |
| CN | 105186157 B | 1/2018 |
| CN | 109301570 A | 2/2019 |
| CN | 109462090 A | 3/2019 |
| CN | 213816642 U | 7/2021 |
| CN | 214313631 U | 9/2021 |
| CN | 214478021 U | 10/2021 |
| CN | 214478259 U | 10/2021 |
| JP | 3202707 U | 2/2016 |
| JP | 2021-96960 A | 6/2021 |
| TW | M534916 U | 1/2017 |

* cited by examiner

ELECTRICAL CONNECTOR AND METHOD OF MAKING THE SAME WITH SIMPLIFIED ASSEMBLY FEATURES

CROSS-REFERENCE TO RELATED APPLICATION

This patent application claims priority of a Chinese Patent Application No. 202210134184.5, filed on Feb. 14, 2022 and titled "ELECTRICAL CONNECTOR AND METHOD OF MAKING THE SAME", the entire content of which is incorporated herein by reference.

TECHNICAL FIELD

The present disclosure relates to an electrical connector and a method of making the same, which belongs to a technical field of connectors.

BACKGROUND

An electrical connector in the related art includes a body, a plurality of conductive terminals fixed to the body, a metal shielding plate and a metal mounting plate. The plurality of conductive terminals include a plurality of first conductive terminals and a plurality of second conductive terminals. The metal shielding plate is installed in the body, and located between the plurality of first conductive terminals and the plurality of second conductive terminals, so as to perform isolation and shielding functions and reduce signal crosstalk.

However, in the related art, the metal shielding plate and the body are usually connected by soldering. This increases the complexity of manufacturing to some extent, the assembly efficiency is lower, and the cost is higher.

The metal shielding plate and the metal mounting plate are usually two components provided separately. These two components also need to be fixed by soldering or the like. Before soldering, additional fixtures need to be provided for positioning, which results in lower production efficiency and yield, and higher cost.

In addition, solder slag will inevitably be generated during soldering. However, if the solder slag falls on the conductive terminals, it will easily cause a short circuit and reduce the reliability of the product.

SUMMARY

An object of the present disclosure is to provide an electrical connector and a manufacturing method thereof with lower cost.

In order to achieve the above object, the present disclosure adopts the following technical solution: an electrical connector, including: a body, the body including a base portion and a tongue plate protruding beyond the base portion along a first direction, the tongue plate including a first mating surface and a second mating surface opposite to the first mating surface; a plurality of first conductive terminals, each first conductive terminal including a first mating portion exposed on the first mating surface and a first fixing portion connected to the first mating portion; a plurality of second conductive terminals, each second conductive terminal including a second mating portion exposed on the second mating surface and a second fixing portion connected to the second mating portion, the plurality of first conductive terminals and the plurality of second conductive terminals being arranged at intervals along a second direction perpendicular to the first direction, respectively; and a metal shielding member, the metal shielding member including a shielding plate located between the first fixing portions of the plurality of first conductive terminals and the second fixing portions of the plurality of second conductive terminals; wherein the base portion includes a receiving groove and a holding groove communicated with the receiving groove, the shielding plate is accommodated in the receiving groove, the metal shielding member further includes an elastic arm extending from the shielding plate, and the elastic arm is held in the holding groove to abut against the body.

In order to achieve the above object, the present disclosure adopts the following technical solution: an electrical connector, including: a body, the body including a base portion and a tongue plate protruding beyond the base portion along a first direction, the tongue plate including a first mating surface and a second mating surface opposite to the first mating surface; a plurality of first conductive terminals, each first conductive terminal including a first mating portion exposed on the first mating surface and a first fixing portion connected to the first mating portion; a plurality of second conductive terminals, each second conductive terminal including a second mating portion exposed on the second mating surface and a second fixing portion connected to the second mating portion, the plurality of first conductive terminals and the plurality of second conductive terminals being arranged at intervals along a second direction perpendicular to the first direction, respectively; and a metal shielding member, the metal shielding member including a shielding plate located between the first fixing portions of the plurality of first conductive terminals and the second fixing portions of the plurality of second conductive terminals; wherein the metal shielding member includes a mounting plate integrally formed with the shielding plate, the mounting plate is perpendicular to the shielding plate, the shielding plate is stamped from the mounting plate, and the metal shielding member is in elastic contact with the body.

In order to achieve the above object, the present disclosure adopts the following technical solution: a method of making the electrical connector, including steps of: S1: fixing the plurality of first conductive terminals and the plurality of second conductive terminals to the body; and S2: assembling the metal shielding member to the body, and the metal shielding member being fixed to the body without soldering.

Compared with the prior art, the base portion of the present disclosure includes a receiving groove and a holding groove communicating with the receiving groove; the shielding plate is received in the receiving groove, the metal shielding member further includes an elastic arm extending from the shielding plate, and the elastic arm is held in the holding groove so as to be in contact with the body. With this arrangement, the soldering process of the metal shielding member and the body can be omitted, the manufacturing complexity is reduced, the assembly efficiency is improved, and the cost is reduced.

In addition, the metal shielding member of the present disclosure includes a mounting plate integrally formed with the shielding plate, the mounting plate is perpendicular to the shielding plate, the shielding plate is stamped from the mounting plate, and the metal shielding member is in elastic contact with the body. With this arrangement, the soldering process of the shielding plate and the mounting plate can be omitted, the manufacturing complexity is reduced, the assembly efficiency is improved, and the cost is reduced.

DETAILED DESCRIPTION

Figure 1:
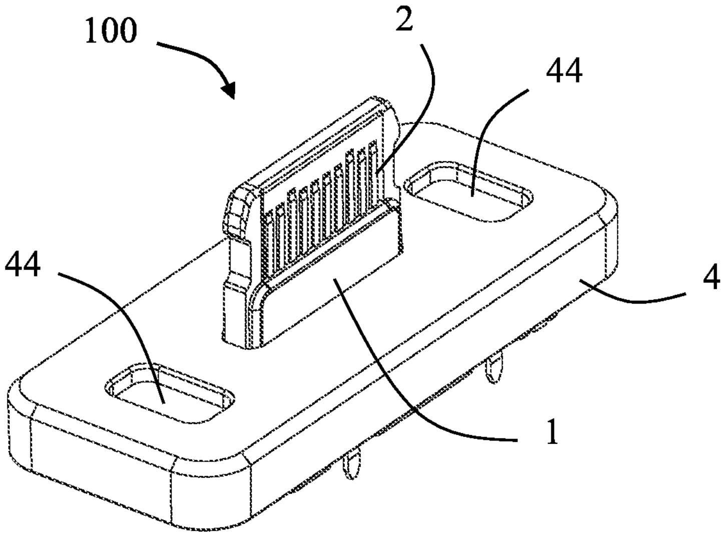
FIG. 1 is a perspective schematic view of an electrical connector in accordance with an embodiment of the present disclosure.
Figure 2:
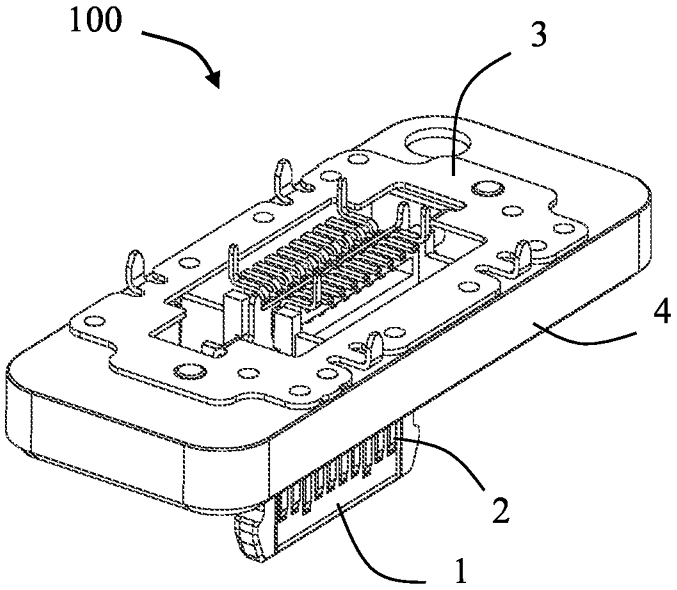
FIG. 2 is a perspective schematic view of the electrical connector in another angle of FIG. 1.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms “a”, “said”, and “the” used in this application and the appended claims are also intended to include plural forms unless the context clearly indicates other meanings.

It should be understood that the terms “first”, “second” and similar words used in the specification and claims of this application do not represent any order, quantity or importance, but are only used to distinguish different components. Similarly, “an” or “a” and other similar words do not mean a quantity limit, but mean that there is at least one; “multiple” or “a plurality of” means two or more than two. Unless otherwise noted, “front”, “rear”, “lower” and/or “upper” and similar words are for ease of description only and are not limited to one location or one spatial orientation. Similar words such as “include” or “comprise” mean that elements or objects appear before “include” or “comprise” cover elements or objects listed after “include” or “comprise” and their equivalents, and do not exclude other elements or objects. The term “a plurality of” mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIGS. 1 to 9, an illustrated embodiment of the present disclosure discloses an electrical connector 100 including a body 1, a plurality of conductive terminals 2 fixed to the body 1, a metal shielding member 3 mounted to the body 1, and a metal mounting block 4 mounted to the body 1. In the illustrated embodiment of the present disclosure, the electrical connector 100 is a USB Type C plug connector. Of course, it is understandable to those skilled in the art that in other embodiments of the present disclosure, the electrical connector 100 may also be an HDMI plug connector, a DisplayPort plug connector, etc., which will not be repeated in the present disclosure.

Referring to FIG. 4, FIG. 5, and FIGS. 9 to 13, in the embodiment of the present disclosure, the body 1 includes an insulating block 13, an insulating plate 14 and a metal bracket 15. The plurality of conductive terminals 2 are fixed to the insulating block 13. In the embodiment shown in the present disclosure, the plurality of conductive terminals 2 are insert-molded with the insulating block 13 to form a whole. A plurality of first terminal receiving slots 141 and a plurality of second terminal receiving slots 142 are provided on two opposite surfaces of the insulating plate 14, respectively. In addition, the body 1 further includes a first reinforcing plate 161 and a second reinforcing plate 162 which are fixed on the insulating block 13. In an embodiment of the present disclosure, the first reinforcing plate 161 and the second reinforcing plate 162 are both made of metal materials. The first reinforcing plate 161 and the second reinforcing plate 162 are both L-shaped and symmetrically arranged on opposite sides of the insulating block 13. In the embodiment shown in the present disclosure, the first reinforcing plate 161 and the second reinforcing plate 162 are fixed to the metal bracket 15 by soldering.

In the illustrated embodiment of the present disclosure, the metal bracket 15 is formed by metal injection molding (MIM). The so-called “metal injection molding” refers to a molding method in which a plasticized mixture of metal powder and its binder is injected into a mold. The molding method is to first mix the selected powder with the binder, then granulate the mixture, and then inject the desired shape. In the illustrated embodiment of the present disclosure, the insulating plate 14 is injection-molded on the metal bracket 15 to form a whole. Referring to FIG. 4, FIG. 5, and FIGS. 9 to 13, during assembly, an integral part composed of the first conductive terminals 21, the second conductive terminals 22, the first reinforcing plate 161 and the second reinforcing plate 162 is assembled with an integral part composed of the insulating plate 14 and the metal bracket 15. Of course, in other embodiments, the insulating plate 14 and the insulating block 13 may also be integrated. That is, the insulating plate 14 and the insulating block 13 are integrally formed. The plurality of conductive terminals 2 are insert-molded with the insulating block 13 and the insulating plate 14.

Figure 9:
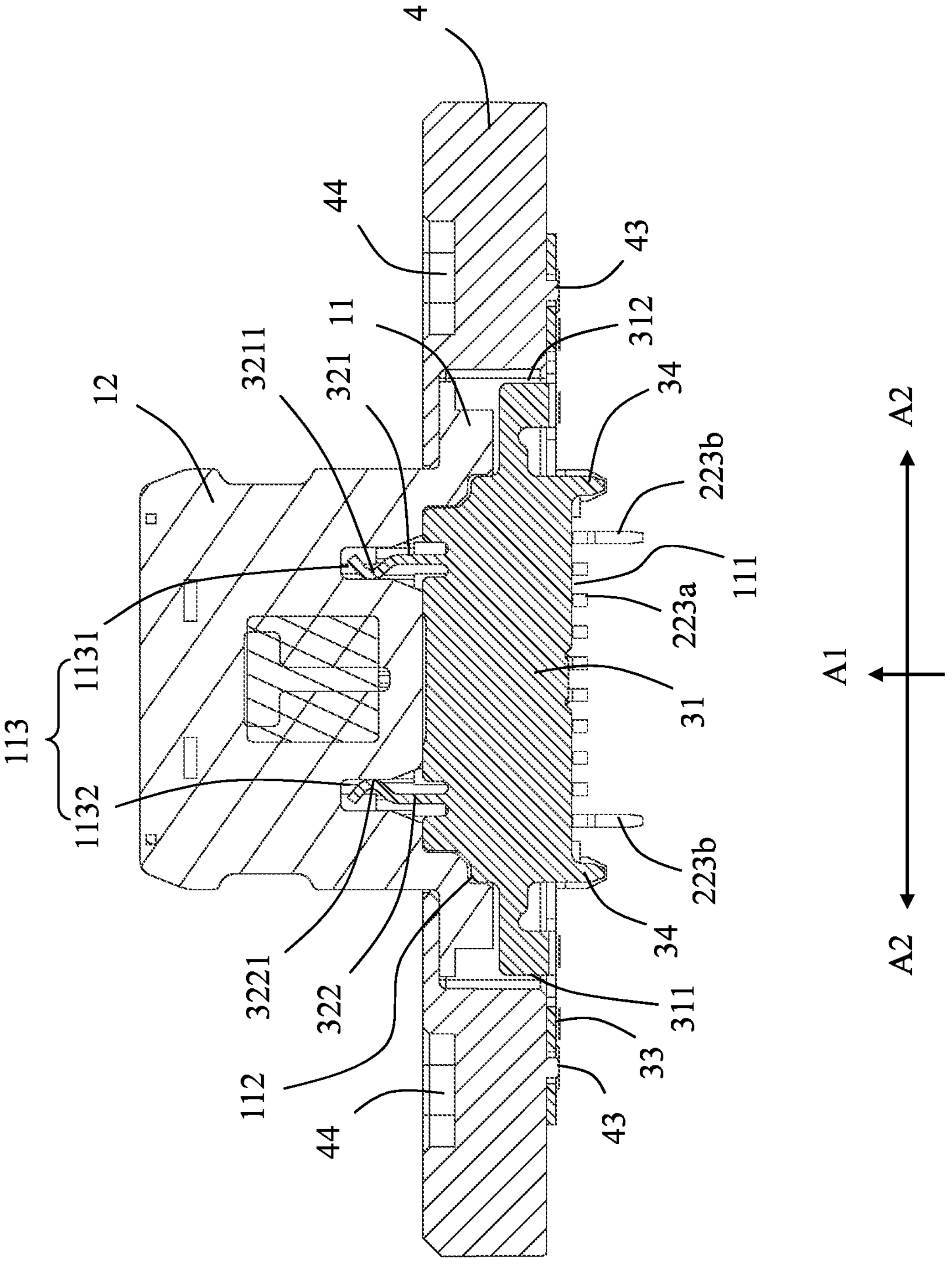
FIG. 9 is a schematic cross-sectional view taken along line B-B in FIG. 8.
Figure 10:
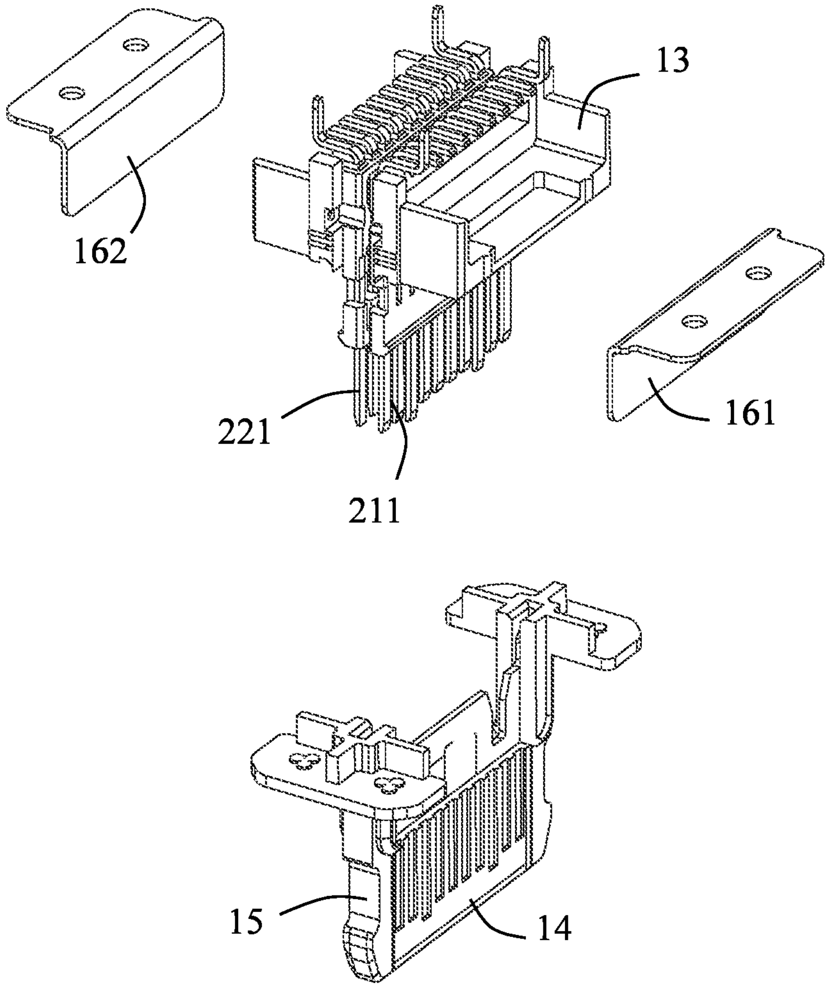
FIG. 10 is a partially exploded perspective view after removing the metal shielding member in FIG. 4.
Figure 11:
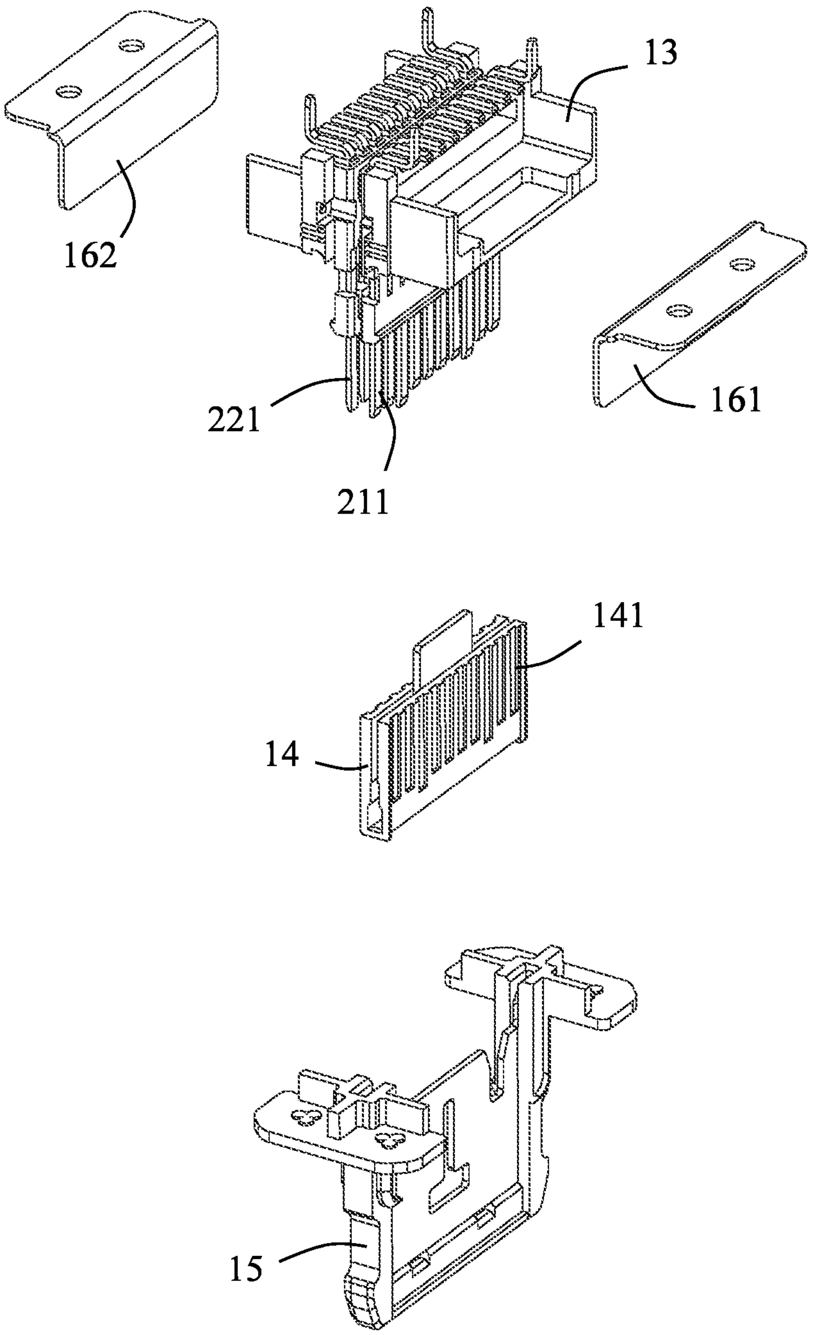
FIG. 11 is a further exploded perspective view of FIG. 10.
Figure 12:
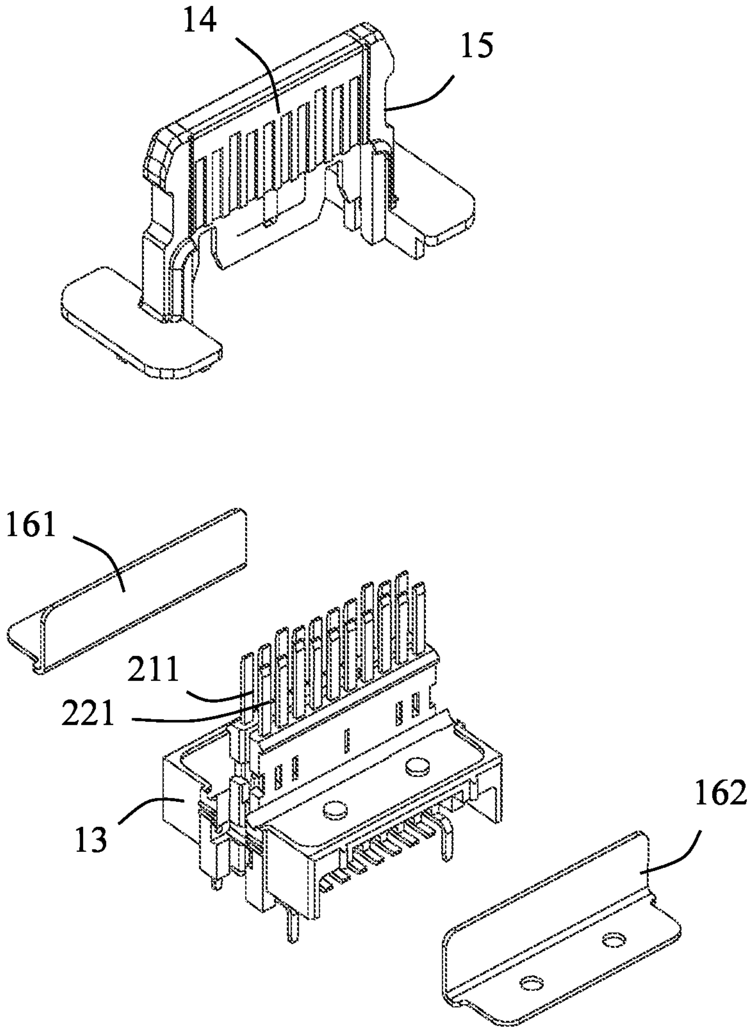
FIG. 12 is a partially exploded perspective view after removing the metal shielding member in FIG. 5.
Figure 13:
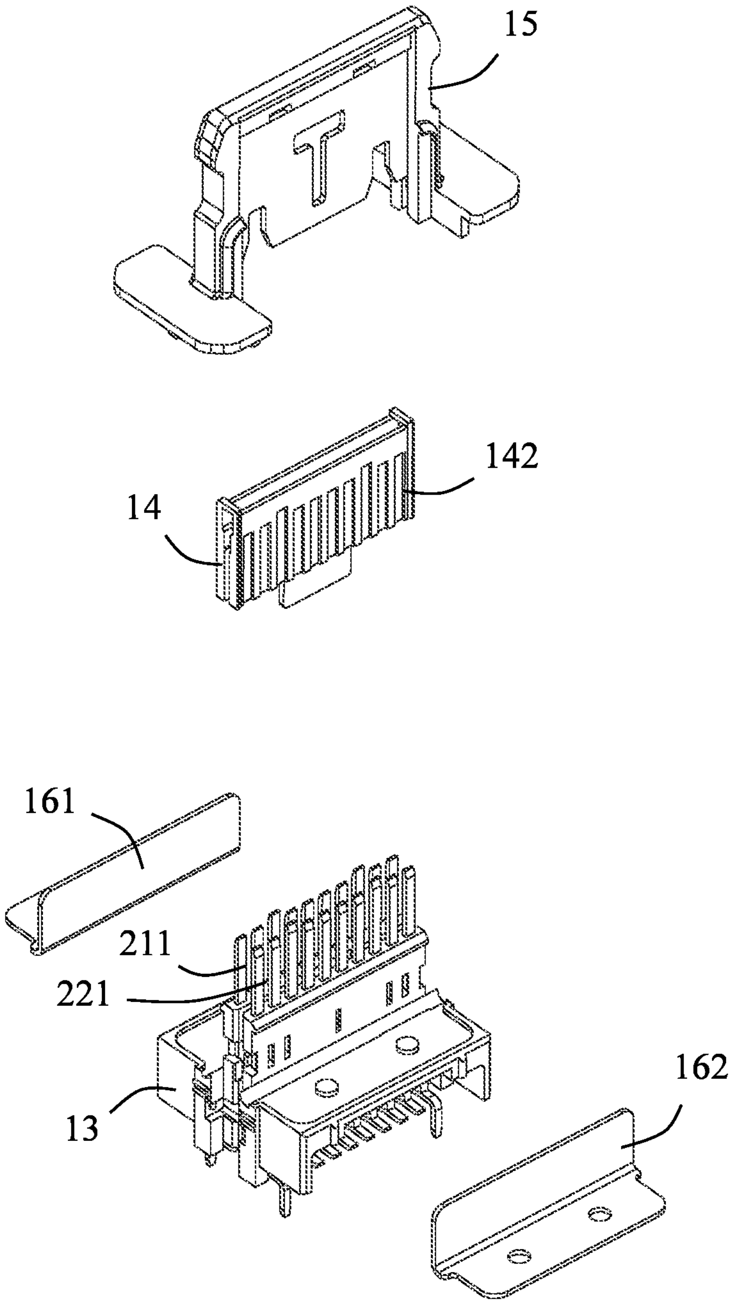
FIG. 13 is a further exploded perspective view of FIG. 12.

The body 1 includes a base portion 11 and a tongue plate 12 protruding from the base portion 11 along a first direction A1. Referring to FIG. 9, the base portion 11 includes an end surface 111 opposite to the tongue plate 12. The body 1 further includes a receiving groove 112 extending through the end surface 111 and a holding groove 113 communicating with the receiving groove 112. In the embodiment shown in the present disclosure, the holding groove 113 includes a first holding groove 1131 and a second holding groove 1132 which are arranged at intervals along a second direction A2-A2 perpendicular to the first direction A1. The first holding groove 1131 and the second holding groove 1132 further extend into the tongue plate 12 along the first direction A1.

Figure 4:
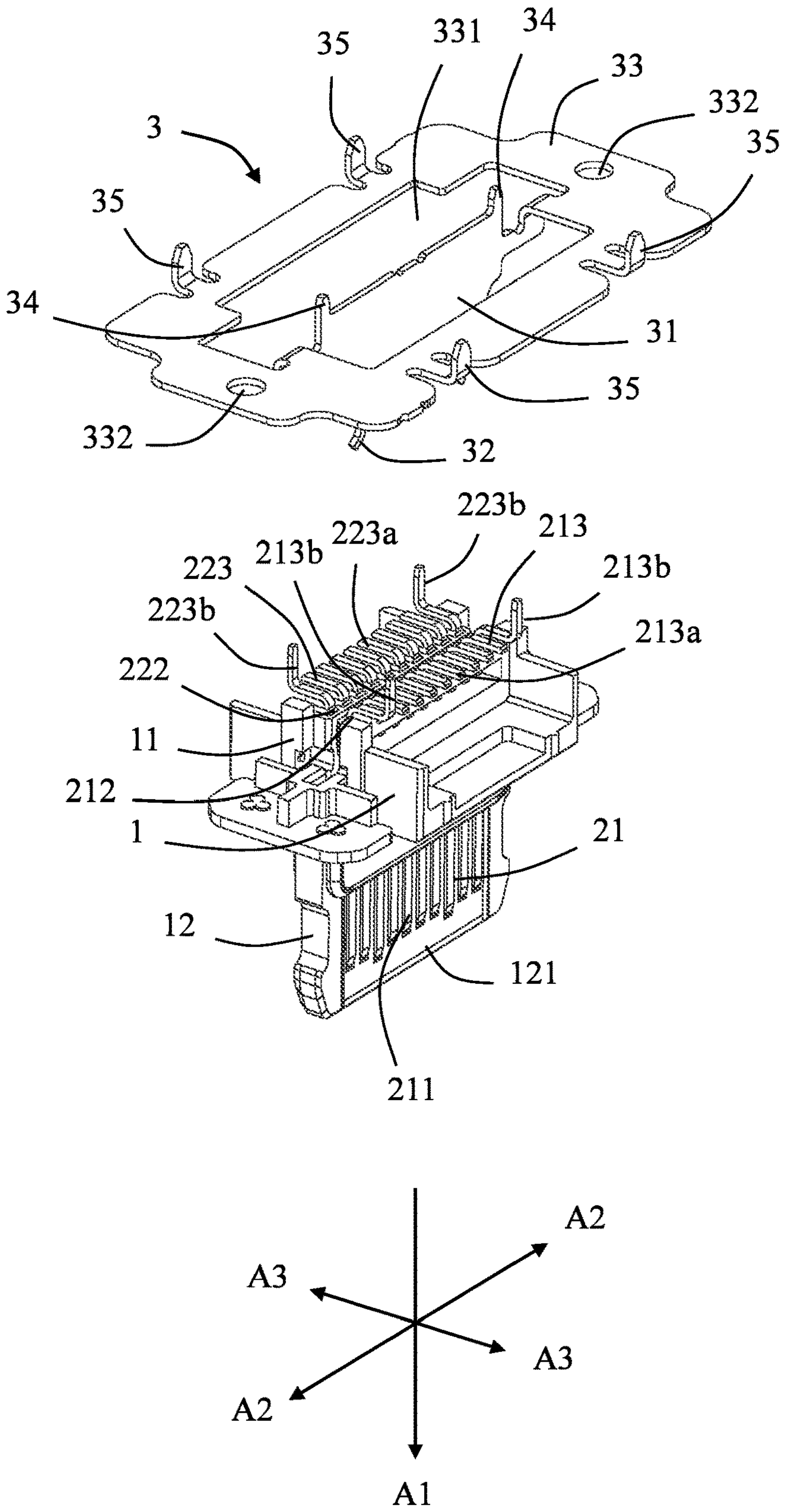
FIG. 4 is a further partial perspective exploded view after removing a metal mounting block in FIG. 3.
Figure 5:
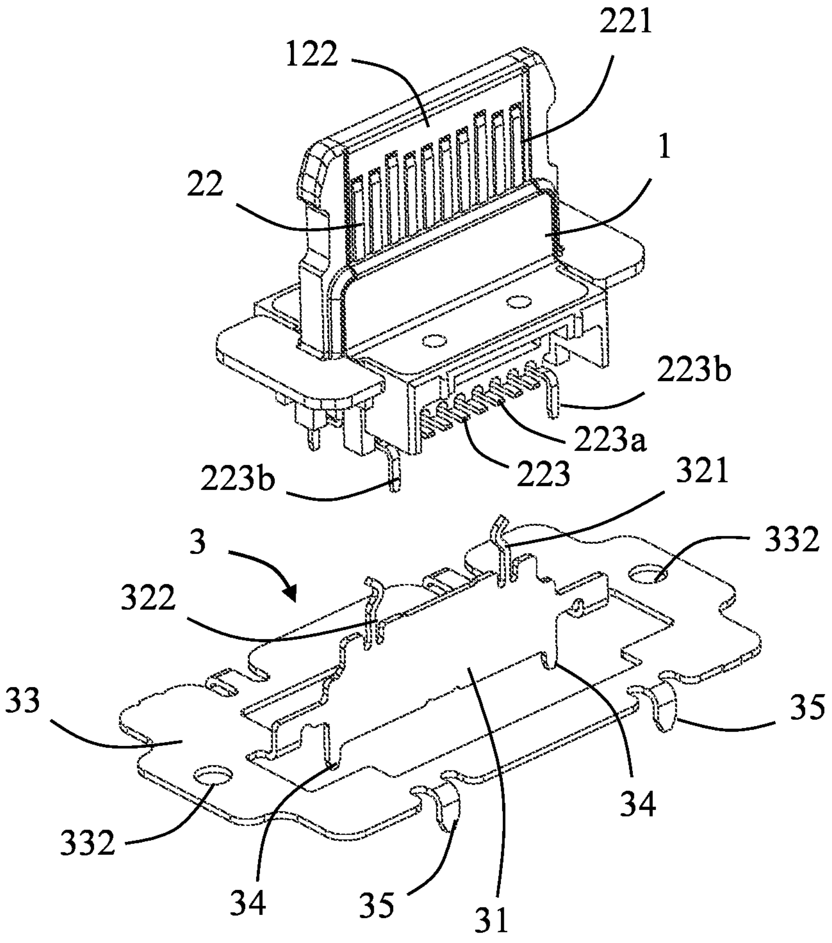
FIG. 5 is a partial perspective exploded view of another angle of FIG. 4.
Figure 6:
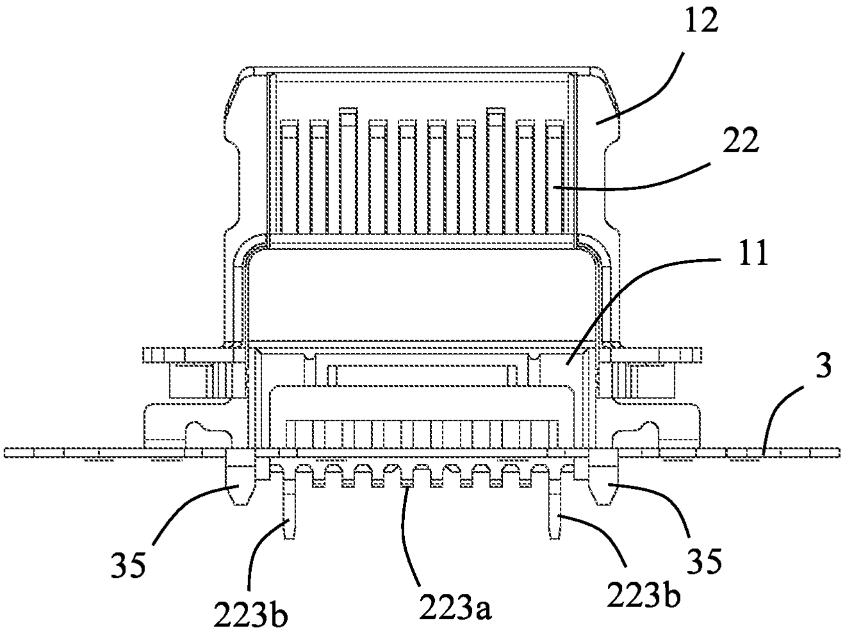
FIG. 6 is a front view after removing the metal mounting block in FIG. 1.
Figure 7:
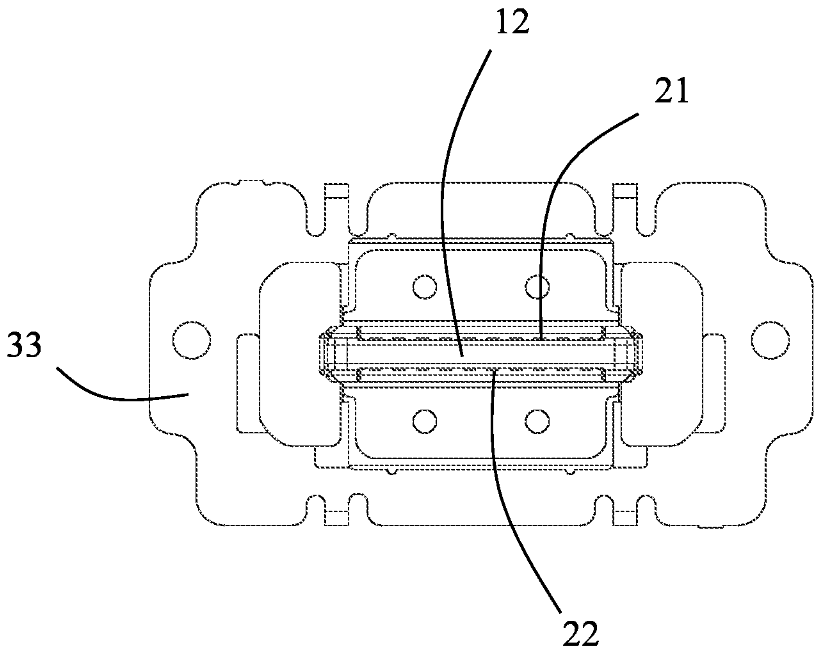
FIG. 7 is a top view of FIG. 6.
Figure 8:
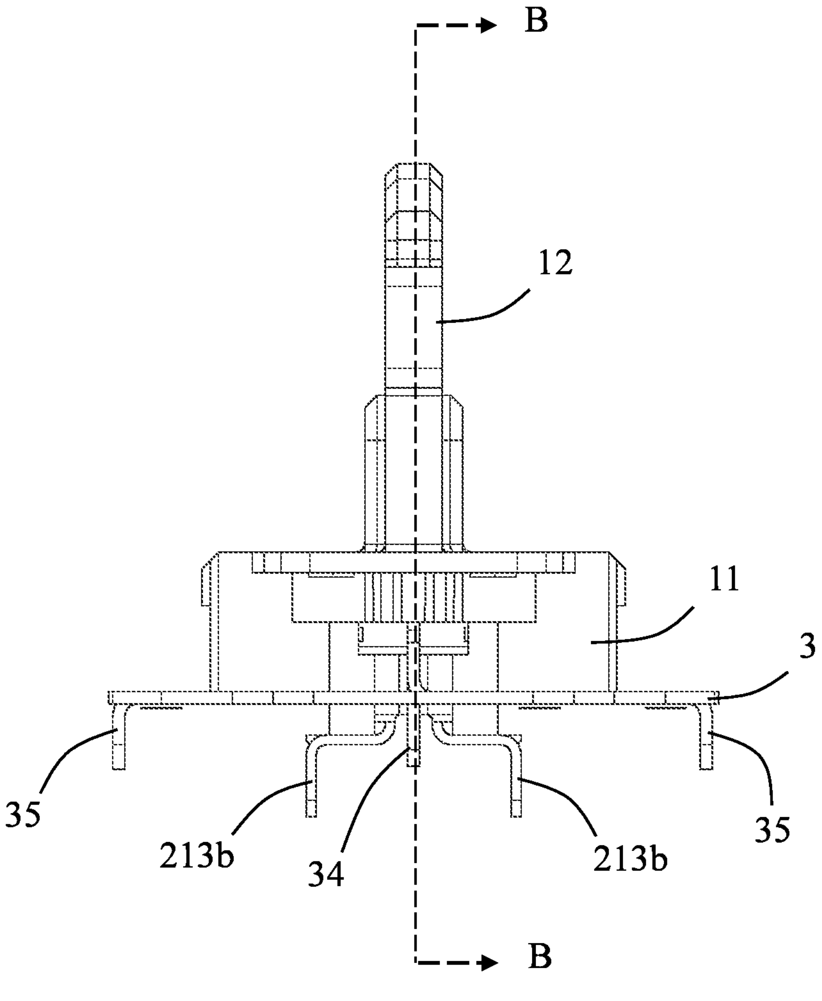
FIG. 8 is a left side view of FIG. 6.

Referring to FIG. 4 and FIG. 5, the tongue plate 12 is of a flat-shaped configuration, and includes a first mating surface 121 and a second mating surface 122 opposite to the first mating surface 121. The tongue plate 12 is adapted to be inserted into a mating connector (not shown).

The plurality of conductive terminals 2 include a plurality of first conductive terminals 21 and a plurality of second conductive terminals 22. Each of the first conductive terminals 21 includes a first mating portion 211 exposed on the first mating surface 121, a first fixing portion 212 connected to the first mating portion 211, and a first mounting foot 213 extending from the first fixing portion 212. In an embodiment of the present disclosure, both the first mating portion 211 and the first fixing portion 212 extend along the first direction A1. In the embodiment shown in the present disclosure, the first mounting feet 213 of the plurality of first conductive terminals 21 include a plurality of first soldering portions 213*a* extending along a third direction A3-A3 and at least one second soldering portion 213*b* extending in a direction opposite to the first direction A1. The third direction A3-A3 is perpendicular to the first direction A1-A1 and the second direction A2-A2. In the embodiment shown in the present disclosure, the number of the second soldering portions 213*b* is two. The two second soldering portions 213*b* are located outside the first soldering portions 213*a* in the second direction A2-A2 (e.g., two outermost sides).

Each of the second conductive terminals 22 includes a second mating portion 221 exposed on the second mating surface 122, a second fixing portion 222 connected to the second mating portion 221, and a second mounting foot 223 extending from the second fixing portion 222. In the embodiment shown in the present disclosure, the plurality of first conductive terminals 21 and the plurality of second conductive terminals 22 are arranged at intervals along the second direction, respectively. The second mating portion 221 and the second fixing portion 222 extend along the first direction A1. In the embodiment shown in the present disclosure, the second mounting feet 223 of the plurality of second conductive terminals 22 include a plurality of third soldering portions 223*a* extending along the third direction A3-A3 and at least one fourth soldering portion 223*b* extending in the direction opposite to the first direction A1. In the embodiment shown in the present disclosure, the number of the fourth soldering portions 223*b* is two. The two fourth soldering portions 223*b* are located outside the third soldering portions 223*a* in the second direction A2-A2 (e.g., two outermost sides). The first soldering portions 213*a* and the third soldering portions 223*a* are aligned along the third direction. The second soldering portions 213*b* and the fourth soldering portions 223*b* are aligned along the third direction.

In the illustrated embodiment of the present disclosure, the first soldering portions 213*a* and the third soldering portions 223*a* are adapted for surface soldering to a circuit board (not shown). The second soldering portions 213*b* and the fourth soldering portions 223*b* are adapted for through-hole soldering to the circuit board. By arranging the second soldering portions 213*b* on opposite sides of the first soldering portions 213*a*, and by arranging the fourth soldering portions 223*b* on opposite sides of the third soldering portions 223*a*, it can play a certain role in positioning the electrical connector 100 when it is mounted on the circuit board. By having this design, on one hand, is beneficial to realize the surface soldering of the first soldering portions 213*a* and the third soldering portions 223*a* with the circuit board, and improve the soldering quality; on the other hand, it is also beneficial to protect soldering locations of the first soldering portions 213*a* and the third soldering portions 223*a* and the circuit board, and reduce the risk of damage to the soldering locations by external force.

In an embodiment of the present disclosure, the first conductive terminals 21 and the second conductive terminals 22 are insert-molded with the insulating block 13 of the body 1. Specifically, the first fixing portions 212 of the first conductive terminals 21 and the second fixing portions 222 of the second conductive terminals 22 are fixed in the insulating block 13 of the body 1. The first mounting feet 213 of the first conductive terminals 21 and the second mounting feet 223 of the second conductive terminals 22 protrude beyond the end surface 111 to be soldered and fixed to the circuit board. The first mating portions 211 of the first conductive terminals 21 and the second mating portions 221 of the second conductive terminals 22 protrude beyond the insulating block 13 in a cantilevered manner. The first mating portions 211 of the first conductive terminals 21 and the second mating portions 221 of the second conductive terminals 22 are received in the first terminal receiving slots 141 and the second terminal receiving slots 142, respectively.

Referring to FIGS. 3 to 9, in the embodiment shown in the present disclosure, the metal shielding member 3 includes a shielding plate 31, an elastic arm 32 extending from the shielding plate 31, a mounting plate 33 integrated with the shielding plate 31, two first fixing feet 34 extending from the shielding plate 31 in a direction opposite to the first direction A1 and protruding beyond the mounting plate 33, and a plurality of second fixing feet 35 protruding from the mounting plate 33 in the direction opposite to the first direction A1.

The shielding plate 31 is received in the receiving groove 112 along the first direction A1. The shielding plate 31 is located between the first fixing portions 212 of the plurality of first conductive terminals 21 and the second fixing portions 222 of the plurality of second conductive terminals 22, so as to separate the plurality of first conductive terminals 21 and the plurality of second conductive terminals 22, thereby achieving a better shielding effect. In the embodiment shown in the present disclosure, a width of the shielding plate 31 along the second direction A2-A2 is greater than an entire span of the first conductive terminals 21, and the width of the shielding plate 31 along the second direction A2-A2 is also greater than an entire span of the second conductive terminals 22. Specifically, the shielding plate 31 includes a first side edge 311 and a second side edge 312 opposite to the first side edge 311. The first side edge 311 extends beyond the plurality of first conductive terminals 21 and the plurality of second conductive terminals 22 to one side along the second direction A2-A2. The second side edge 312 extends beyond the plurality of first conductive terminals 21 and the plurality of second conductive terminals 22 to another opposite side along the second direction A2-A2. In this way, the shielding plate 31 can better shield the plurality of first conductive terminals 21 and the plurality of second conductive terminals 22.

Referring to FIG. 5 and FIG. 9, the elastic arm 32 is held in the holding groove 113 to be in contact with the body 1. Specifically, in the embodiment shown in the present disclosure, the elastic arm 32 includes a first elastic arm 321 held in the first holding groove 1131 and a second elastic arm 322 held in the second holding groove 1132. In the embodiment shown in the present disclosure, the first elastic arm 321 includes a first arc-shaped portion 3211 protruding toward the second elastic arm 322 along the second direction A2-A2. The second elastic arm 322 includes a second arc-shaped portion 3221 protruding toward the first elastic arm 321 along the second direction A2-A2. In other words, the first arc-shaped portion 3211 and the second arc-shaped portion 3221 protrude toward each other. This design is beneficial to improve a clamping force of the first elastic arm 321 and the second elastic arm 322 to jointly clamp the body 1, improve the contact reliability, and reduce the risk of loosening.

The mounting plate 33 is adapted to mate with the base portion 11. The mounting plate 33 is perpendicular to the shielding plate 31. The mounting plate 33 includes a hollow portion 331 corresponding to the shielding plate 31. The shielding plate 31 is stamped from the mounting plate 33. Such a design can save the soldering process of the shielding plate 31 and the mounting plate 33, improve production efficiency and yield, and reduce costs.

In the illustrated embodiment of the present disclosure, the mounting plate 33 is of a frame-shaped configuration, so that the structural strength of the mounting plate 33 is kept from being reduced to an unacceptable level by stamping to form the shielding plate 31. The mounting plate 33 is provided with mounting holes 332 on both sides for matching with the metal mounting block 4.

In addition, the first fixing feet 34 and the second fixing feet 35 are adapted for being soldered to the circuit board. In the embodiment shown in the present disclosure, the first fixing feet 34 are located outside the first mounting feet 213 of the first conductive terminals 21 and the second mounting feet 223 of the second conductive terminals 22 along the second direction A2-A2. Besides, the first fixing feet 34 are located between the first mounting feet 213 of the first conductive terminals 21 and the second mounting feet 223 of the second conductive terminals 22 along the third direction A3-A3. This design is beneficial to further protect soldering locations of the first soldering portions 213*a* and the third soldering portions 223*a*, and the circuit board, and reduce the risk of damage to the soldering locations by external force.

Figure 3:
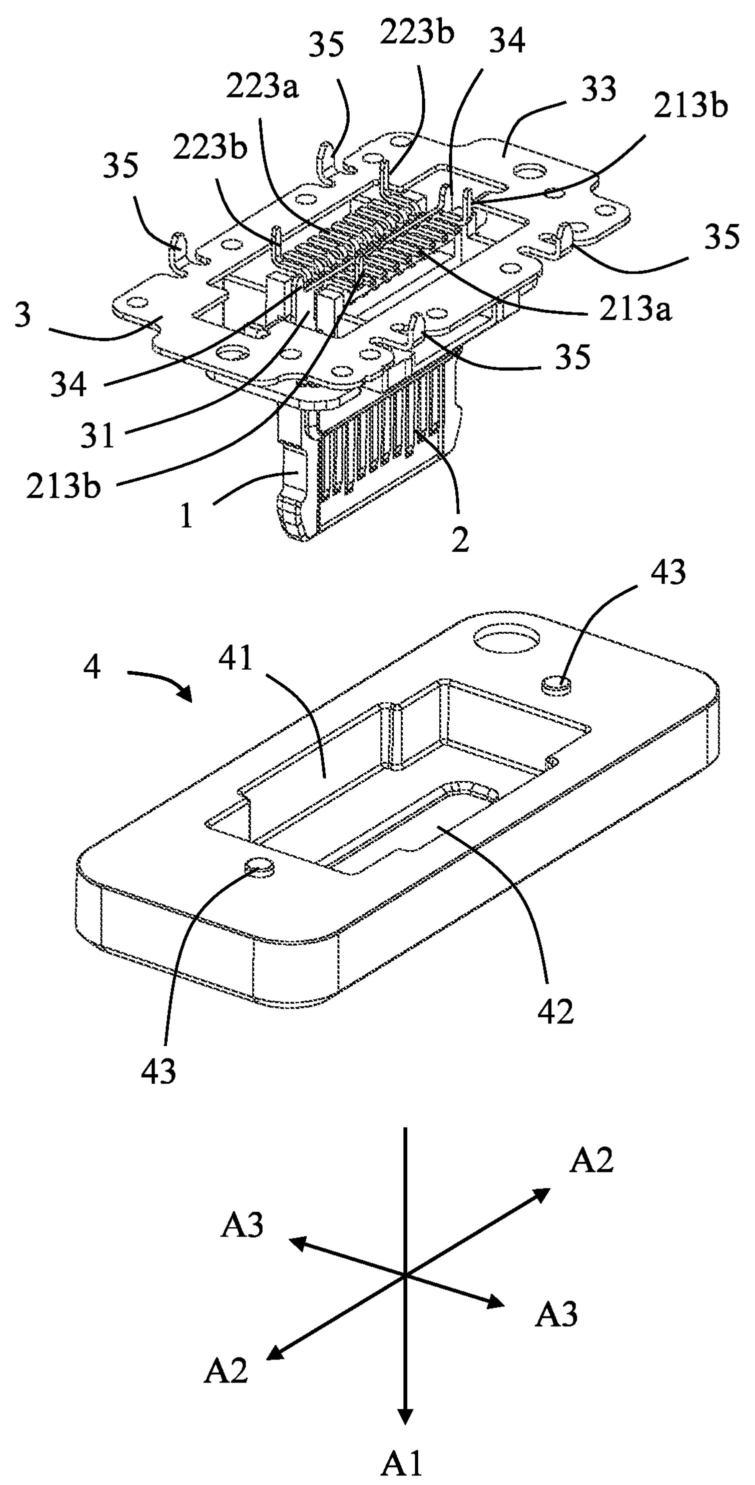
FIG. 3 is a partial perspective exploded view of FIG. 2.

Referring to FIG. 1, FIG. 3 and FIG. 9, the metal mounting block 4 is provided with a recessed slot 41, an opening 42 communicating with the recessed slot 41, and two positioning posts 43 for matching with the mounting holes 332. The base portion 11 is received in the recessed slot 41. The tongue plate 12 passes through the opening 42 to protrude beyond the metal mounting block 4 along the first direction A1. The mounting plate 33 is fixed to the metal mounting block 4 by soldering. In the embodiment shown in the present disclosure, the mounting plate 33 and the metal mounting block 4 are fixed by spot soldering. The metal mounting block 4 also includes at least one positioning groove 44 for matching with an outer housing (not shown). The positioning groove 44 is located outside of the tongue plate 12 along the second direction A2-A2. In the embodiment shown in the present disclosure, two positioning grooves 44 are provided and located on opposite sides of the tongue plate 12 along the second direction A2-A2.

The present disclosure also discloses a method of making the electrical connector 100, and the method includes the following steps:

S1: fixing the plurality of first conductive terminals 21 and the plurality of second conductive terminals 22 to the body 1;

S2: assembling the metal shielding member 3 to the body 1, and the metal shielding member 3 and the body 1 are fixed without soldering;

S3: assembling the metal mounting block 4 to the body 1; and

S4: fixing the metal mounting block 4 and the mounting plate 33 of the metal shielding member 3 by soldering.

In an embodiment of the present disclosure, the step S1 includes the following sub-steps:

S11: insert-molding the plurality of first conductive terminals 21 and the plurality of second conductive terminals 22 with the insulating block 13;

S12: metal injection molding the metal bracket 15;

S13: injection molding the insulating plate 14 on the metal bracket 15;

S14: assembling an integral part composed of the first conductive terminals 21, the second conductive terminals 22 and the insulating block 13 and an integral part composed of the insulating plate 14 and the metal bracket 15.

It is understandable to those skilled in the art that the steps of the method of making the electrical connector 100 can be flexibly adjusted in order or performed simultaneously as required. For example, the sequence of sub-steps S11 and S12 may be reversed or performed simultaneously.

Compared with the prior art, the base portion 11 of the electrical connector 100 of the present disclosure includes a receiving groove 112 and a holding groove 113 communicating with the receiving groove 112, the shielding plate 31 is received in the receiving groove 112, the metal shielding member 3 further includes an elastic arm 32 extending from the shielding plate 31, and the elastic arm 32 is held in the holding groove 113 to abut against the body 1. With this arrangement, the soldering process of the metal shielding member 3 and the body 1 can be omitted, the manufacturing complexity is reduced, the assembly efficiency is improved, and the cost is reduced.

Besides, the metal shielding member 3 of the present disclosure includes a mounting plate 33 integrally formed with the shielding plate 31, the mounting plate 33 is perpendicular to the shielding plate 31, the mounting plate 33 includes a hollow portion 331 corresponding to the shielding plate 31, the shielding plate 31 is stamped from the mounting plate 33, and the metal shielding member 3 is in elastic contact with the body 1. With this arrangement, the soldering process of the shielding plate 31 and the mounting plate 33 can be omitted, the manufacturing complexity is reduced, the assembly efficiency is improved, and the cost is reduced.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector, comprising:

a body, the body comprising a base portion and a tongue plate protruding beyond the base portion along a first direction, the tongue plate comprising a first mating surface and a second mating surface opposite to the first mating surface;

a plurality of first conductive terminals, each first conductive terminal comprising a first mating portion exposed on the first mating surface and a first fixing portion connected to the first mating portion;

a plurality of second conductive terminals, each second conductive terminal comprising a second mating portion exposed on the second mating surface and a second fixing portion connected to the second mating portion, the plurality of first conductive terminals and the plurality of second conductive terminals being arranged at intervals along a second direction perpendicular to the first direction, respectively; and a metal shielding member, the metal shielding member comprising a shielding plate located between the first fixing portions of the plurality of first conductive terminals and the second fixing portions of the plurality of second conductive terminals;

wherein the base portion comprises a receiving groove and a holding groove communicated with the receiving groove, the shielding plate is accommodated in the receiving groove, the metal shielding member further comprises an elastic arm extending from the shielding plate, and the elastic arm is held in the holding groove to abut against the body; and wherein the shielding plate is assembled and secured to the body along the first direction.

2. The electrical connector according to claim 1, wherein the body comprises an insulating block, an insulating plate and a metal bracket; the metal bracket is formed by metal injection molding, the first mating portions and the second mating portions are located on the insulating plate; and the first fixing portions and the second fixing portions are fixed in the insulating block.

3. The electrical connector according to claim 1, wherein the body comprises an end face opposite to the tongue plate, the receiving groove extends through the end face; each first conductive terminal comprises a first mounting foot extending from the first fixing portion, each second conductive terminal comprises a second mounting foot extending from the second fixing portion, and the first mounting feet and the second mounting feet protrude beyond the end face.

4. The electrical connector according to claim 3, wherein the first mounting feet of the plurality of first conductive terminals comprise a plurality of first soldering portions extending along a third direction and at least one second soldering portion extending in a direction opposite to the first direction, the third direction is perpendicular to the first direction and the second direction;

the second mounting feet of the plurality of second conductive terminals comprise a plurality of third soldering portions extending along the third direction and at least one fourth soldering portion extending in the direction opposite to the first direction.

5. The electrical connector according to claim 4, wherein two second soldering portions are provided and located outside the first soldering portions along the second direction; and two fourth soldering portions are provided and located outside the third soldering portions along the second direction.

6. The electrical connector according to claim 1, wherein the shielding plate comprises a first side edge and a second side edge opposite to the first side edge, the first side edge extends beyond the plurality of first conductive terminals and the plurality of second conductive terminals to one side along the second direction, and the second side edge extends beyond the plurality of first conductive terminals and the plurality of second conductive terminals to another side along the second direction.

7. The electrical connector according to claim 1, wherein the holding groove comprises a first holding groove and a second holding groove arranged at intervals along the second direction, the elastic arm comprises a first elastic arm held in the first holding groove and a second elastic arm held in the second holding groove.

8. The electrical connector according to claim 7, wherein the first elastic arm comprises a first arc-shaped portion protruding toward the second elastic arm along the second direction, and the second elastic arm comprises a second arc-shaped portion protruding toward the first elastic arm along the second direction.

9. The electrical connector according to claim 1, wherein the metal shielding member further comprises a mounting plate integrally formed with the shielding plate, the mounting plate is adapted to mate with the base portion, and the mounting plate is perpendicular to the shielding plate.

10. The electrical connector according to claim 9, wherein the mounting plate comprises a hollow portion corresponding to the shielding plate, and the shielding plate is stamped from the mounting plate.

11. The electrical connector according to claim 9, wherein the metal shielding member further comprises a first fixing foot extending from the shielding plate and protruding beyond the mounting plate along a direction opposite to the first direction; and wherein the metal shielding member further comprises a second fixing foot extending from the mounting plate and protruding beyond the mounting plate along the direction opposite to the first direction.

12. The electrical connector according to claim 9, further comprising a metal mounting block; wherein the metal mounting block is provided with a recessed slot and an opening communicated with the recessed slot, the base portion is received in the recessed slot, the tongue plate passes through the opening, and the mounting plate is soldered and fixed to the metal mounting block.

13. The electrical connector according to claim 12, wherein the metal mounting block comprises a positioning groove for mating with an outer housing, and the positioning groove is located outside the tongue plate along the second direction.

14. A method of making an electrical connector as claimed in claim 1, the method comprising steps of:

S1: fixing the plurality of first conductive terminals and the plurality of second conductive terminals to the body; and S2: assembling the metal shielding member to the body, and the metal shielding member being fixed to the body without soldering.

15. An electrical connector, comprising:

a body, the body comprising a base portion and a tongue plate protruding beyond the base portion along a first direction, the tongue plate comprising a first mating surface and a second mating surface opposite to the first mating surface;

a plurality of first conductive terminals, each first conductive terminal comprising a first mating portion exposed on the first mating surface and a first fixing portion connected to the first mating portion;

a plurality of second conductive terminals, each second conductive terminal comprising a second mating portion exposed on the second mating surface and a second fixing portion connected to the second mating portion, the plurality of first conductive terminals and the plurality of second conductive terminals being arranged at intervals along a second direction perpendicular to the first direction, respectively; and a metal shielding member, the metal shielding member comprising a shielding plate located between the first fixing portions of the plurality of first conductive terminals and the second fixing portions of the plurality of second conductive terminals;

wherein the metal shielding member comprises a mounting plate integrally formed with the shielding plate, the mounting plate is perpendicular to the shielding plate, the shielding plate is stamped from the mounting plate, and the metal shielding member is in elastic contact with the body; and wherein the shielding plate is assembled and secured to the body along the first direction.

16. The electrical connector according to claim 15, wherein the body comprises an end face opposite to the tongue plate, the base portion defines a receiving groove extending through the end face; each first conductive terminal comprises a first mounting foot extending from the first fixing portion, each second conductive terminal comprises a second mounting foot extending from the second fixing portion, and the first mounting feet and the second mounting feet protrude beyond the end face.

17. The electrical connector according to claim 16, wherein the first mounting feet of the plurality of first conductive terminals comprise a plurality of first soldering portions extending along a third direction and at least one second soldering portion extending in a direction opposite to the first direction, the third direction is perpendicular to the first direction and the second direction;

the second mounting feet of the plurality of second conductive terminals comprise a plurality of third soldering portions extending along the third direction and at least one fourth soldering portion extending in the direction opposite to the first direction.

18. The electrical connector according to claim 17, wherein two second soldering portions are provided and located outside the first soldering portions along the second direction; and two fourth soldering portions are provided and located outside the third soldering portions along the second direction.

19. The electrical connector according to claim 15, wherein the metal shielding member further comprises a first fixing foot extending from the shielding plate and protruding beyond the mounting plate along a direction opposite to the first direction; and wherein the metal shielding member further comprises a second fixing foot extending from the mounting plate and protruding beyond the mounting plate along the direction opposite to the first direction.

20. The electrical connector according to claim 15, further comprising a metal mounting block; wherein the metal mounting block is provided with a recessed slot and an opening communicated with the recessed slot, the base portion is received in the recessed slot, the tongue plate passes through the opening, and the mounting plate is soldered and fixed to the metal mounting block.

* * * * *